(12) United States Patent
Nakano et al.

(10) Patent No.: US 7,126,371 B2
(45) Date of Patent: Oct. 24, 2006

(54) MULTI-FUNCTION IC CARD

(75) Inventors: Hiroo Nakano, Atsugi (JP); Shinichi Hasebe, Kitaadachi-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 649 days.

(21) Appl. No.: 10/327,513

(22) Filed: Dec. 20, 2002

(65) Prior Publication Data

US 2004/0078661 A1    Apr. 22, 2004

(30) Foreign Application Priority Data

Dec. 20, 2001    (JP)    ............................. 2001-388277

(51) Int. Cl.
  *G06F 7/38*    (2006.01)
  *G06F 11/00*   (2006.01)
  *G06F 1/26*    (2006.01)
  *G06F 1/28*    (2006.01)
  *G06F 1/30*    (2006.01)

(52) U.S. Cl. .......................... 326/38; 326/37; 326/46; 326/93; 713/320; 713/324; 713/340; 714/1; 714/3; 714/14; 714/22; 714/48; 714/2

(58) Field of Classification Search ............ 326/37–38, 326/46, 93; 713/320, 324, 340; 714/1–3, 714/14, 22, 48
See application file for complete search history.

(56) References Cited

U.S. PATENT DOCUMENTS

| | | | | |
|---|---|---|---|---|
| 5,309,449 A | * | 5/1994 | Gandini et al. | ............. 714/781 |
| 5,541,861 A | * | 7/1996 | Komoda et al. | ............... 703/15 |
| 5,761,446 A | * | 6/1998 | Donley et al. | ............. 710/107 |
| 5,944,813 A | * | 8/1999 | Trimberger | ................... 712/36 |
| 6,035,357 A | | 3/2000 | Sakaki | |
| 6,072,849 A | * | 6/2000 | Sessions | ....................... 377/28 |
| 6,469,549 B1 | * | 10/2002 | Carson et al. | ............... 327/115 |
| 6,545,508 B1 | * | 4/2003 | Senba | ......................... 327/20 |

FOREIGN PATENT DOCUMENTS

| | | | |
|---|---|---|---|
| JP | 9-54727 | | 2/1997 |
| JP | 9-330387 | | 12/1997 |
| JP | 2002251227 A | * | 9/2002 |
| KR | 10-0286193 | | 4/2001 |
| TW | 420788 | | 2/2002 |

* cited by examiner

*Primary Examiner*—Rexford Barnie
*Assistant Examiner*—Jason Crawford
(74) *Attorney, Agent, or Firm*—Frommer Lawrence & Haug LLP

(57) ABSTRACT

When a reset signal /RESET is "L", a flip-flop circuit holds "1"; on the other hand, a flip-flop circuit holds "0". When the reset signal /RESET becomes "H", the flip-flop circuits captures data in synchronous with a clock signal. When a power supply voltage returns to the initial value after an instantaneous blackout occurs, the data of the flip-flop circuits have the same value. An output signal of an exclusive-OR gate circuit becomes "L", the output is held in a flip-flop circuit. As a result, an instantaneous blackout detection signal becomes "H".

7 Claims, 8 Drawing Sheets

MULTI-FUNCTION IC CARD

CROSS-REFERENCE TO RELATED APPLICATIONS

This application is based upon and claims the benefit of priority from the prior Japanese Patent Application No. 2001-388277, filed Dec. 20, 2001, the entire contents of which are incorporated herein by reference.

BACKGROUND OF THE INVENTION

1. Field of the Invention

The present invention relates to a multi-function IC card having a built-in IC chip, such as wireless cards and combination cards.

2. Description of the Related Art (1) In recent years, the spread of IC cards such as wireless cards and combination cards is astonishing. There has been made the study of building various functions including security in the IC card.

For example, if the power supply of an IC card reader/writer becomes unstable due to the influence by noise, or if a temporarily blackout takes place, a temporarily blackout (instantaneous blackout) also takes place in the power supply of the IC card. When the above instantaneous blackout occurs, an IC built in the IC card crashes or malfunctions.

In order to prevent the occurrence of the above phenomenon, it is desirable that the IC card includes the following function. That is, when an instantaneous blackout occurs, the IC card detects it, and performs suitable processings so that the IC does not have the above crash or malfunction.

(2) The IC cards such as wireless cards and combination cards have the following problem. When data transmission/reception is carried out with respect to a wireless communication reader/writer, user can not confirm the following results with the use of the IC card. That is, the user can not confirm whether or not data transmission/reception is accurately carried out, and whether or not proper processing is carried out by the data transmission/reception.

More specifically, when making wireless communication, it is convenient if the user can confirm the result relevant to data transmission/reception with the use of a closely related IC card. However, the user has conventionally confirmed the above result using the display function of the wireless communication reader/writer or peripheral devices connected directly thereto.

In order to improve the availability of the IC card, it is desirable that the IC card includes a display function of displaying the result relevant to the data transmission/reception.

(3) In a mobile information device such as mobile phone, security information has been conventionally controlled for each device. For this reason, unless security information is registered in the mobile information device, the following problem arises. That is, if the user loses the mobile information device, a person, who picked it up, freely uses the user's mobile information device.

In order to solve the above problem, the mobile information device is provided with a function of loading an IC card, and it is most effective to collectively control the security information by the IC card. For instance, recently, there has been known an IC card called SIM card, and a mobile information device having a built-in SIM card is increasing.

Incidentally, the SIM card is a general term for IC cards having a size smaller than a credit card.

Considering the above device loading the IC card, in order to further improve the security function of the device, it is desirable that the IC card includes a function capable of registering advanced information relevant to security.

As described above, the IC card is configured to have various functions; for example, there has been proposed to collectively control all informations including security information by one IC card.

When configuring the multi-function IC card as described above, the user is now making a demand that the IC card includes the following various functions. That is, the functions are an instantaneous blackout detecting function, a display function relevant to data transmission/reception, and an advanced security function.

BRIEF SUMMARY OF THE INVENTION

According to an aspect of the present invention, there is provided an IC chip using for an IC card comprising: a CPU; and an instantaneous blackout detecting circuit detecting a temporary step-down of a power supply potential supplied to circuits including the CPU, and giving information relevant to the step-down of the power supply potential to the CPU. The CPU executes predetermined interrupt handling or processing for stopping the self-operation when the power supply potential steps down.

According to another aspect of the present invention, there is provided an instantaneous blackout detecting circuit comprising: a plurality of flip-flop circuits connected like a ring; and logic circuits making an exclusive-OR operation of output signals of mutually adjacent two flip-flop circuits of the plurality of flip-flop circuits. In this case, the initial condition is set so that data of mutually adjacent two flip-flop circuits of the plurality of flip-flop circuits becomes mutually different value.

According to another aspect of the present invention, there is provided a multi-function IC card comprising: an IC chip performing data processing; and a display section displaying information relevant to the data transmission/reception. The display section is one of a luminous display section, a speech (voice) display section and a vibration display section, for example. Further, the display section is one of LED and organic EL, for example.

According to another aspect of the present invention, there is provided a multi-function IC card using for a mobile information device comprising: an information recording area recording pattern information used as security information; and a CPU performing the pattern information processing.

According to another aspect of the present invention, there is provided a mobile information device comprising: the above-mentioned multi-function IC card; a data input section for inputting the pattern information; and an operation control section controlling the operation of a device main body.

DETAILED DESCRIPTION OF THE INVENTION

A multi-function IC card according to an aspect of the present invention will be described below in detail with reference to the accompanying drawings. The above multi-function IC card according to an aspect of the present invention relates to the following IC cards. That is, the IC cards include an IC with an instantaneous blackout detecting function, an IC card having a display function and an IC card having a security information registering function.

(1) IC card with an instantaneous blackout detecting function

① The multi-function IC card according to an aspect of the present invention has the following features. An IC chip built in the IC card is provided with an instantaneous blackout detecting circuit, which can detect an instantaneous blackout at high probability. If the instantaneous blackout is detected, the instantaneous blackout detecting circuit controls a CPU so that the CPU makes interrupt handling, or stops the CPU, and thereby, the crash or malfunction of the IC is prevented.

② IC Chip

Figure 1:
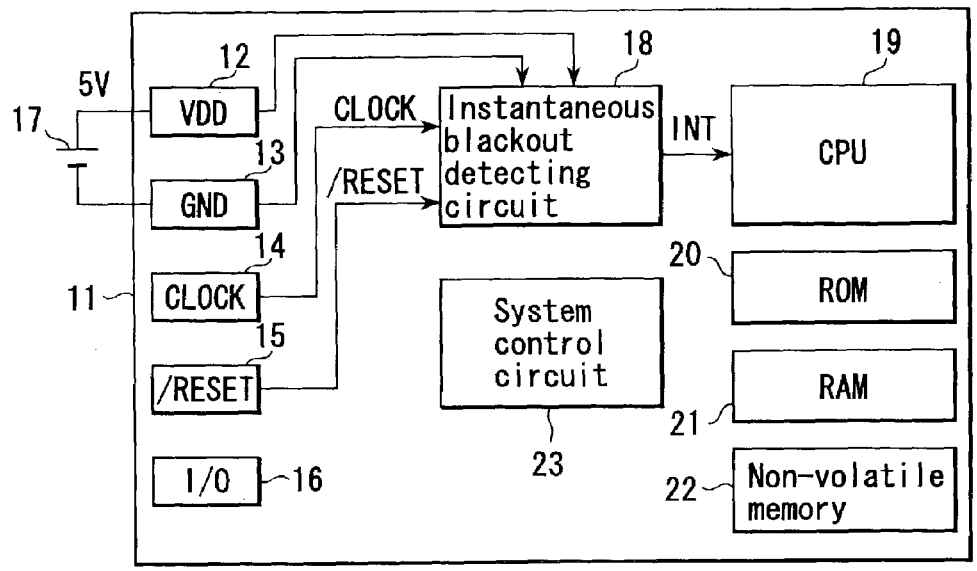
FIG. 1 is a block diagram showing the configuration of an IC chip having a built-in instantaneous blackout detecting circuit according to the present invention.

FIG. 1 shows the configuration of an IC chip built in an IC card with an instantaneous blackout detecting function according to an aspect of the present invention.

An IC chip 11 has a power supply terminal 12, a ground terminal 13, a clock terminal 14, a reset terminal 15 and an input/output terminal 16.

A power supply 17 is connected between the power supply terminal 12 and the ground terminal 13. A clock signal CLOCK controlling the operation of the IC chip is given to the clock terminal 14. A reset signal /RESET is a signal for resetting the state of an instantaneous blackout detecting circuit 18, and given to the reset terminal 15. Data is inputted to the IC chip 11 via the input/output terminal, and outputted outside the IC chip 11.

The above clock signal CLOCK and reset signal /RESET are inputted to the instantaneous blackout detecting circuit 18. When detecting an instantaneous blackout, the instantaneous blackout detecting circuit 18 outputs an instantaneous blackout detection signal INT. In this case, since the instantaneous blackout means a temporary blackout, the potential (e.g., 5 V) of the power supply 17 temporarily steps down in the instantaneous blackout. The instantaneous blackout detecting circuit 18 detects the potential step-down of the power supply 17.

In FIG. 1, for simplification, only signal lines related to the instantaneous blackout detecting circuit 18 are shown.

When receiving the instantaneous blackout detection signal INT, a CPU 19 executes interrupt handling for preventing the crash or malfunction of IC. In addition, when receiving the instantaneous blackout detection signal INT, system may be built up so that the CPU 19 stops the operation.

A ROM (program ROM) 20 stores programs including a malfunction preventive routine executed when an instantaneous blackout occurs. Besides, the IC chip 11 is formed with a RAM 21 and a non-volatile memory 22. A system control circuit 23 controls a series of operations of the system.

③ Embodiment 1 of Instantaneous Blackout Detecting Circuit

Figure 2:
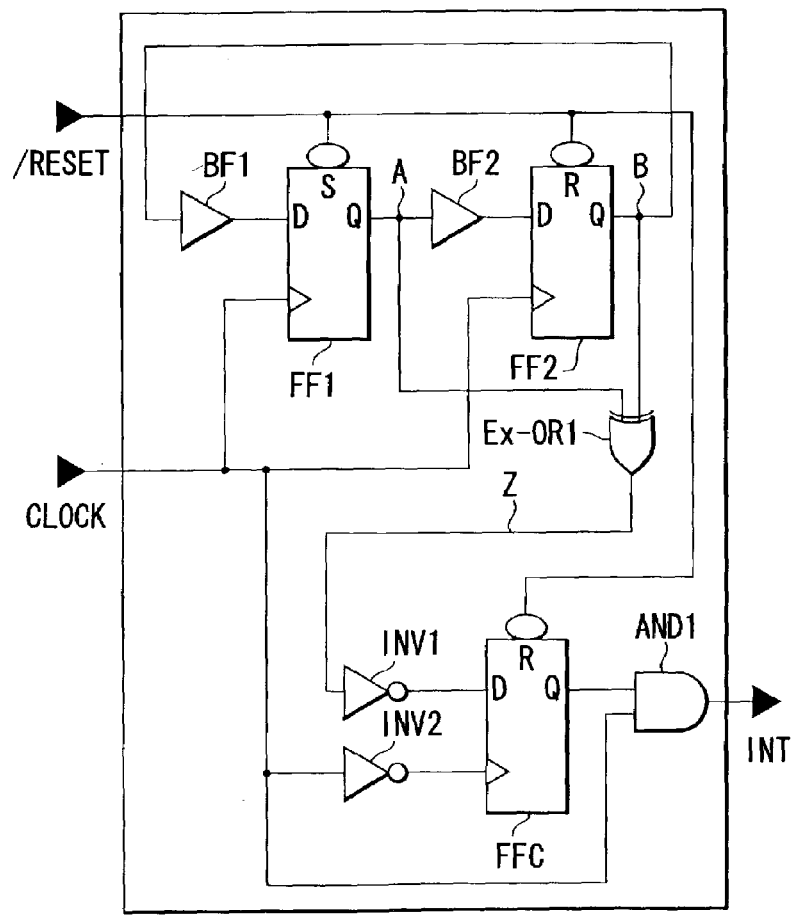
FIG. 2 is a block diagram showing an embodiment 1 of the instantaneous blackout detecting circuit.

FIG. 2 shows the embodiment 1 of the instantaneous blackout detecting circuit.

According to the embodiment 1, the instantaneous blackout detecting circuit has two flip-flop circuits FF1 and FF2 constituting an instantaneous blackout detecting section, a flip-flop circuit FFC.

An output terminal Q of the flip flop circuit FF1 is connected to one of two input terminals of an exclusive-OR gate circuit Ex-OR1 while being connected to an input terminal D of the flip-flop circuit FF2 via a buffer BF2.

An output terminal Q of the flip-flop circuit FF2 is connected to the other of two input terminals of the exclusive-OR gate circuit Ex-OR1 while being connected to the input terminal D of the flip-flop circuit FF1 via a buffer BF1.

An output terminal of the exclusive-OR gate circuit Ex-OR1 is connected to an input terminal D of the flip-flop circuit FFC via an inverter INV1. An output terminal Q of the flip-flop circuit FFC is connected to one of two input terminals of an AND gate circuit AND1.

The AND gate circuit AND1 outputs the instantaneous blackout detection signal INT.

The flip-flop circuits FF1 and FF2 individually have a function of transferring the data of the input terminal D to the output terminal Q in synchronous with a rise edge of the clock signal CLOCK when the reset signal /RESET is "H".

The clock signal CLOCK is inputted to the above flip-flop circuits FF1 and FF2. On the other hand, a signal inverting a level of the clock signal CLOCK by an inverter INV2 is inputted to the flip-flop circuit FFC.

Therefore, the flip-flop circuit FFC has a function of transferring the data of the input terminal D to the output terminal Q in synchronous with a fall edge of the clock signal CLOCK, that is, a rise edge of the output signal of the inverter INV2 when the reset signal /RESET is "H".

Namely, shift occurs by a half period of the clock signal CLOCK between timing when the flip-flop circuits FF1 and FF2 transfer data and timing when the flip-flop circuit FFC transfers data.

The reset signal /RESET is a signal for initializing the above flip-flop circuits FF1, FF2 and FFC.

In the embodiment, when the reset signal /RESET becomes "L", the flip-flop circuit FF1 is initialized to a set state (i.e., output is "H" state)(initial state). On the other hand, the flip-flop circuits FF2 and FFC are initialized to a reset state (i.e., output is "L" state)(initial state).

While the reset signal /RESET is "L", the above flip-flop circuits FF1, FF2 and FFC maintains the initial state.

④ Operation

The operation of the instantaneous blackout detecting circuit shown in FIG. 1 and FIG. 2 and system will be described below.

[Normal Operation]

Figure 3:
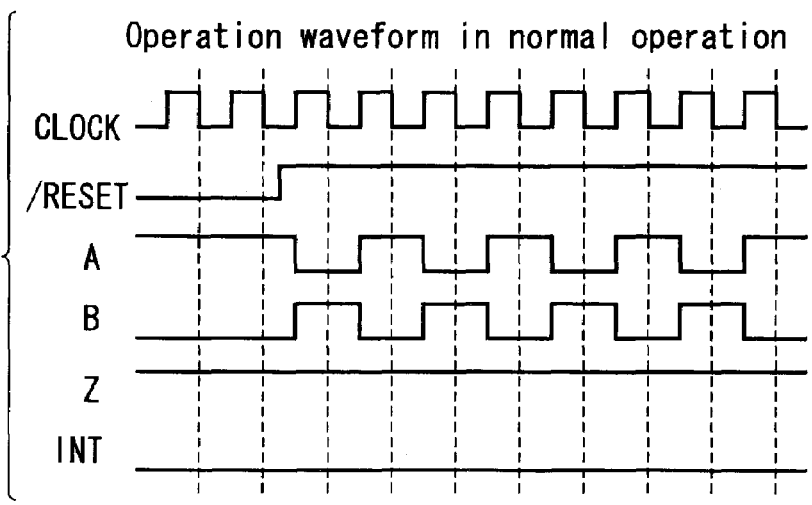
FIG. 3 is a timing diagram showing an operating waveform of the instantaneous blackout detecting circuit in a normal operation.

FIG. 3 shows the operation waveform of the instantaneous blackout detecting circuit in a normal operation.

For example, when power is supplied from an IC card reader/writer to the IC card, and further, a reset signal is supplied, the reset signal /RESET becomes "L"; therefore, the instantaneous blackout detecting circuit is initialized.

More specifically, the output terminal Q (node A) of the flip-flop circuit FF1 becomes "H"; on the other hand, each output terminal Q (node B) of the flip-flop circuits FF2 and FFC become "L".

In this case, two input signals of the above exclusive-OR gate circuit Ex-OR1 have mutually different value (if one is "H", the other is "L"); therefore, the output signal (node Z) becomes "H".

On the other hand, the output terminal Q of the flip-flop circuit FFC becomes "L"; therefore, the output signal of the AND gate circuit AND1 becomes "L". Namely, the instantaneous blackout detection signal INT becomes "L".

While the reset signal /RESET is "L", the above flip-flop circuits FF1, FF2 and FFC maintains the initial state, and the nodes A, B and Z and the instantaneous blackout detection signal INT have no change in its level.

When the reset signal /RESET becomes "H", the flip-flop circuits FF1 and FF2 transfer the data of the input terminal D to the output terminal Q in synchronous with a rise edge of the clock signal CLOCK. On the other hand, the flip-flop circuits FFC transfers the data of the input terminal D to the output terminal Q in synchronous with a rise edge of the output signal of the inverter INV2.

More specifically, when the clock signal CLOCK changes from "L" to "H", data held by the fillip-flop circuit FF1 is shifted to the flip-flop circuit FF2 while being held by the flip-flop circuit FF2. Further, data held by the fillip-flop circuit FF2 is shifted to the flip-flop circuit FF1 while being held by the flip-flop circuit FF2.

Namely, when the instantaneous blackout detecting circuit makes the normal operation, that is, if no instantaneous blackout occurs, the following relationship is given. That is, data values held in the flip-flop circuits FF1 and FF2 always have a mutually inverse relationship (if one is "H", the other is "L").

Therefore, two input signals of the above exclusive-OR gate circuit Ex-OR1 have mutually different value; as a result, the output signal (node Z) continues to keep an "H" state.

Conversely, when the clock signal CLOCK changes from "H" to "L", the output signal of the inverter INV2 changes from "L" to "H". In other words, the flip-flop circuit FFC holds the data of the input terminal D in synchronous with a rise edge of the output signal of the inverter INV2.

However, the node Z is always "H"; therefore, the data of the input terminal D of the flip-flop circuit FFC is always "L". In other words, even if the clock signal CLOCK changes from "H" to "L", the output terminal Q of the flip-flop circuit FFC is intactly kept to "L", and the instantaneous blackout detection signal INT does not become "H".

[Operation when Instantaneous Blackout Occurs]

Outline of Operation

As publicly known, in the IC, there exists internal capacitance such as wiring (interconnection) capacitance and capacitor. For this reason, the internal power-supply voltage of the IC gradually steps down according to time constant depending on the IC internal capacitance after the instantaneous blackout occurs. Further, the internal power-supply voltage of the IC gradually returns to the initial value according to time constant depending on the IC internal capacitance after the instantaneous blackout is completed.

The internal power-supply voltage changes due to the occurrence of instantaneous blackout, and thereby, the IC crashes or malfunctions.

Off course, there is a possibility that the flip-flop circuits FF1 and FF2 of the instantaneous blackout detecting circuit 18 malfunction because the power supply voltage temporarily steps down after the instantaneous blackout occurs. In the present invention, the instantaneous blackout is detected by making use of the malfunction of the above flip-flop circuits FF1 and FF2.

More specifically, in the normal operation, data values held in the fillip-flop circuits FF1 and FF2 have the mutually inverse relationship (if one is "H", the other is "L"), as described above.

When the instantaneous blackout occurs, the fillip-flop circuits FF1 and FF2 malfunction. Further, when the internal power-supply voltage returns to the initial value after the instantaneous blackout is completed, the data value held in these circuits become an arbitrary value. Theoretically, the data held in the flip-flop circuits FF1 and FF2 is any one of four combinations (FF1, FF2)=(0, 0), (0, 1), (1, 0) and (1, 1).

Experimentally, when the instantaneous blackout occurs, the data of the flip-flop circuits FF1 and FF2 has a tendency to both change to the same value (FF1, FF2)=(0, 0) or (1, 1).

In conclusion, when the instantaneous blackout occurs, the data of the flip-flop circuits FF1 and FF2 both have the same value (FF1, FF2)=(0, 0) or (1, 1) at least ½ or more probability.

When the internal power-supply voltage returns to the initial value after the instantaneous blackout is completed, if the data of the flip-flop circuits FF1 and FF2 have the same value, two input signals of the exclusive-OR gate circuit Ex-OR1 have the same value. As a result, the output signal (node Z) becomes "L".

Therefore, the instantaneous blackout detecting circuit 18 can detect the instantaneous blackout at high probability, as seen from the following description relevant to the operation waveform diagram.

Operation Waveform 1 When Instantaneous Blackout Occurs

Figure 4:
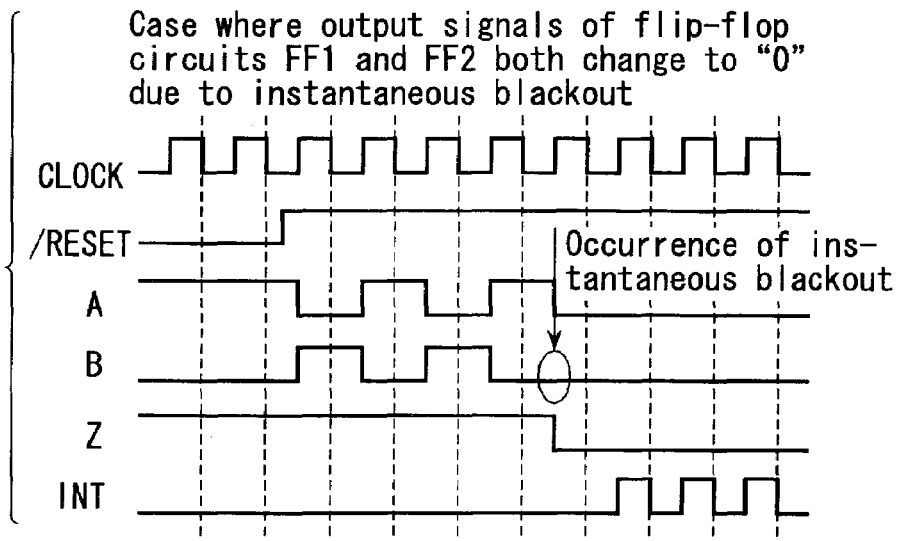
FIG. 4 is a timing diagram showing an operating waveform of the instantaneous blackout detecting circuit when a instantaneous blackout occurs.

FIG. 4 shows an operation waveform 1 of the instantaneous blackout detecting circuit when an instantaneous blackout occurs.

The operation waveform 1 shows the case where the output signals of the flip-flop circuits FF1 and FF2 both change to "0" due to the instantaneous blackout.

According to the embodiment 1, when the internal power-supply voltage returns to the initial value after the instantaneous blackout is completed, the data of the flip-flop circuits FF1 and FF2 both become "0".

Therefore, two input signals of the exclusive-OR gate circuit Ex-OR1 have the same value; as a result, the output signal (node Z) becomes "L".

When the clock signal CLOCK changes from "L" to "H", the data held by the flip-flop circuit FF1 is shifted to the flip-flop circuit FF2 while being held by the flip-flop circuit FF2. On the other hand, the data held by the flip-flop circuit FF2 is shifted to the flip-flop circuit FF1 while being held by the flip-flop circuit FF1.

However, the data of the flip-flop circuits FF1 and FF2 both become "0" due to the instantaneous blackout; therefore, the output signal (node Z) of the exclusive-OR gate circuit Ex-OR1 is intactly kept to "L".

Conversely, when the clock signal CLOCK changes from "H" to "L", the output signal of the inverter INV2 changes from "L" to "H". In other words, the flip-flop FFC holds the data of the input terminal D in synchronous with a rise edge of the output signal of the inverter INV2.

In this case, the node Z changes from "H" to "L" by the instantaneous blackout. For this reason, when the clock signal CLOCK changes from "H" to "L", the output terminal Q of the flip-flop circuit FFC changes from "L" to "H".

Thereafter, the node Z is always kept to "L"; therefore, the output terminal Q of the flip-flop circuit FFC is always kept to "H".

Therefore, the output signal of the AND gate circuit AND1, that is, the instantaneous blackout detection signal INT becomes "H" when the clock signal CLOCK becomes "H".

Based on the above operation, the instantaneous blackout is detected at high probability.

In the embodiment, the AND gate circuit AND1 takes AND (logical product) of the output signal of the flip-flop circuit FFC and the clock signal CLOCK.

The reason is because the instantaneous blackout detection signal INT in detecting the instantaneous blackout is composed of a plurality of pulse signals. When the instantaneous blackout occurs, the instantaneous blackout detecting circuit 18 supplies a plurality of pulse signals (interrupt signal) to the CPU 19, and thereby, the CPU 19 is easy to recognize the instantaneous blackout. For instance, it is possible to effectively prevent the crash or malfunction of IC.

Operation Waveform 2 When Instantaneous Blackout Occurs

Figure 5:
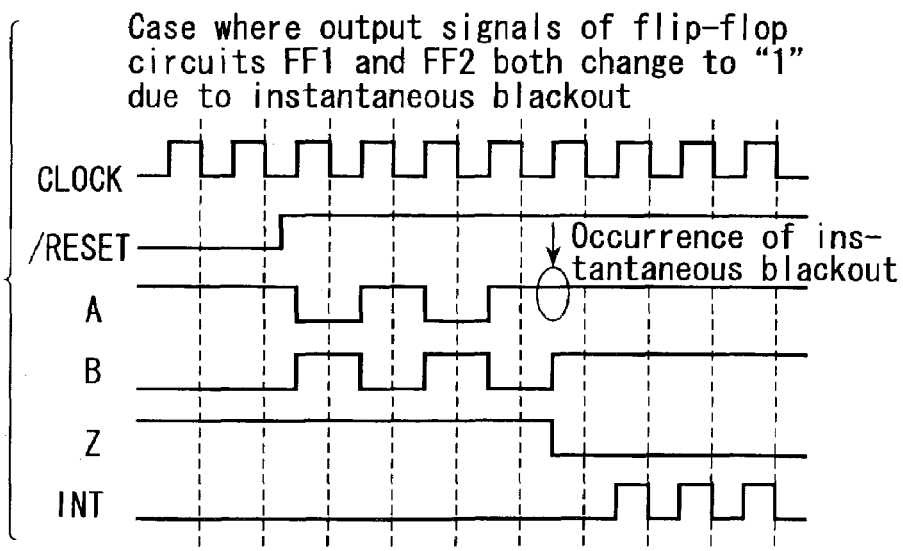
FIG. 5 is a timing diagram showing an operating waveform of the instantaneous blackout detecting circuit when a instantaneous blackout occurs.

FIG. 5 shows an operation waveform 2 of the when instantaneous blackout detecting circuit when an instantaneous blackout occurs.

The operation waveform 2 shows the case where the output signals of the flip-flop circuits FF1 and FF2 both change to "1" due to the instantaneous blackout.

According to the embodiment 1, when the internal when the internal power-supply voltage returns to the initial value after the instantaneous blackout is completed, the data of the flip-flop circuits FF1 and FF2 both become "1".

Therefore, two input signals of the exclusive-OR gate circuit Ex-OR1 have the same value; as a result, the output signal (node Z) becomes "L".

When the clock signal CLOCK changes from "L" to "H", the data held by the flip-flop circuit FF1 is shifted to the flip-flop circuit FF2 while being held by the flip-flop circuit FF2. On the other hand, the data held by the flip-flop circuit FF2 is shifted to the flip-flop circuit FF1 while being held by the flip-flop circuit FF1.

However, the data of the flip-flop circuits FF1 and FF2 both become "1" due to the instantaneous blackout; therefore, the output signal (node Z) of the exclusive-OR gate circuit Ex-OR1 is intactly kept to "L".

Conversely, when the clock signal CLOCK changes from "H" to "L", the output signal of the inverter INV2 changes from "L" to "H". In other words, the flip-flop FFC holds the data of the input terminal D in synchronous with a rise edge of the output signal of the inverter INV2.

In this case, the node Z changes from "H" to "L" by the instantaneous blackout. For this reason, when the clock signal CLOCK changes from "H" to "L", the output terminal Q of the flip-flop circuit FFC changes from "L" to "H".

Thereafter, the node Z is always kept to "L"; therefore, the output terminal Q of the flip-flop circuit FFC is always kept to "H".

Therefore, the output signal of the AND gate circuit AND1, that is, the instantaneous blackout detection signal INT becomes "H" when the clock signal CLOCK becomes "H".

Based on the above operation, the instantaneous blackout is detected at high probability.

Operation After Instantaneous Blackout is Detected

There is a possibility that data of register and program counter included in the CPU 19 and data of a work RAM 21 are destroyed by the instantaneous blackout. In order to prevent the crash or malfunction of IC by the above data destruction, the CPU 19 executes processing for preventing the malfunction when the instantaneous blackout detection signal INT becomes "H".

Incidentally, the following matter is taken into consideration. Namely, it is time until the flip-flop circuits FF1 and FF2 of the instantaneous blackout detecting circuit 18 malfunction and the instantaneous blackout detection signal TNT is outputted after the instantaneous blackout occur. In this case, the position (distance from power supply terminal) and configuration of each circuit are preset so that the above time becomes sufficiently shorter than the time below. Namely, it is time until a possibility appears such that circuits in the IC chip 11 other than the instantaneous blackout detecting circuit 18 malfunction after the instantaneous blackout occur.

In other words, the CPU 19 executes processing for preventing the malfunction before a possibility appears such that circuits such as the CPU 19 and the work RAM 21 malfunction.

Figure 6:
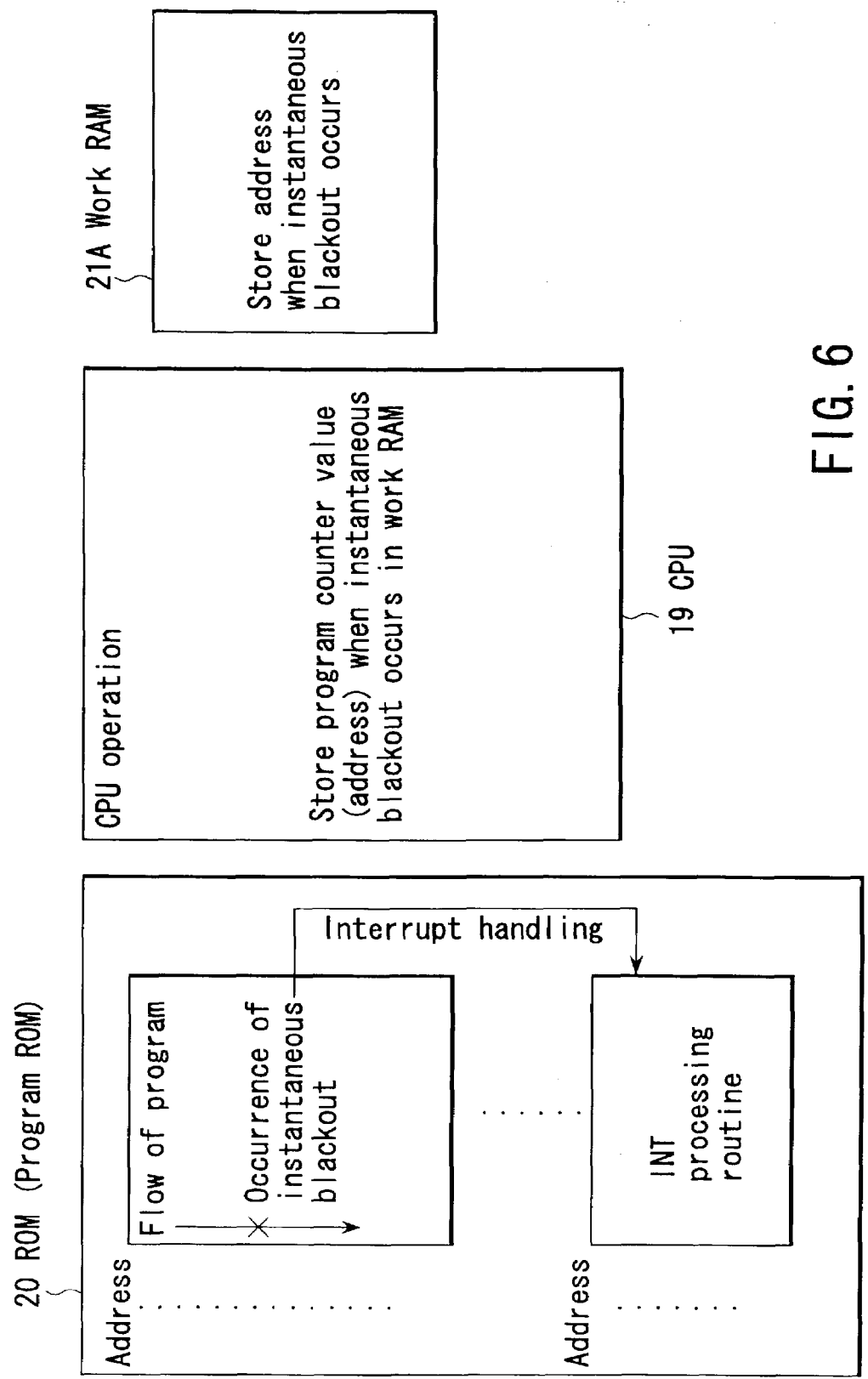
FIG. 6 is a view to explain the operation after the instantaneous blackout is detected.

For example, as shown in FIG. 6, when the instantaneous blackout detection signal INT becomes "H", the CPU 19 stores a current program counter value, that is, address of the program executing when the instantaneous blackout occurs to a work RAM 21A. Thereafter, the CPU 19 executes interrupt handling, that is, jump from the current address to interrupt address, and carries out INT processing routine.

The instantaneous blackout ends, and the internal power-supply voltage returns to the initial value, thereafter, the CPU 19 again starts normal processing from the program executing when the instantaneous blackout occurs.

Incidentally, when the instantaneous blackout detection signal INT becomes "H", the operation of the CPU 19 is fully stopped, and the internal power-supply voltage returns to the initial value, thereafter, the normal program may be executed from first.

When the instantaneous blackout detection signal INT becomes "H", the CPU 19 gives information that the instantaneous blackout occurs in the IC card to the IC card reader/writer. After the instantaneous blackout ends, when receiving information that the internal power-supply voltage restores from the CPU 19, the IC card reader/writer again gives the reset signal to the IC card.

The instantaneous blackout detecting circuit included in the IC chip 11 is initialized because the reset signal /RESET again becomes "L", and makes preparations for the next instantaneous blackout.

In other words, the output terminal Q (node A) of the flip-flop circuit FF1 becomes "H"; on the other hand, the output terminal Q (node B) of the flip-flop circuit FF2 becomes "L".

⑤ Summary

In the embodiment 1 of the instantaneous blackout detecting circuit, it is possible to detect the instantaneous blackout at least ½ or more probability, and thus, to execute processing for preventing the crash or malfunction of IC by the instantaneous blackout.

However, according to the above embodiment 1, it is impossible to fully detect all instantaneous blackouts. In order to enhance the probability of detecting the instantaneous blackout, the instantaneous blackout detecting flip-flop circuit included in the instantaneous blackout detecting circuit 18, that is, the number of flip-flop circuits connected like ring may be increased.

Theoretically, if the number of the flip-flop circuits of the instantaneous blackout detecting of the instantaneous blackout detecting circuit 18 is infinitely increased, it is possible to fully detect all instantaneous blackouts.

In the embodiment 1, it is possible to detect the instantaneous blackout by two flip-flop circuits FF1 and FF2 at least ½ or more probability. The optimal number of the flip-flop circuits of the instantaneous blackout detecting section of the instantaneous blackout detecting circuit 18 is about two to four.

Although described below in detail, if the number of the flip-flop circuits of the instantaneous blackout detecting section of the instantaneous blackout detecting circuit 18 is set to three, it is possible to detect the instantaneous blackout at least ¾ or more probability. Further, if the number of the flip-flop circuits of the same as above is set to four, it is possible to detect the instantaneous blackout at least ⅞ or more probability.

⑥ Embodiment 2 of Instantaneous Blackout Detecting Circuit

[Circuit Configuration]

Figure 7:
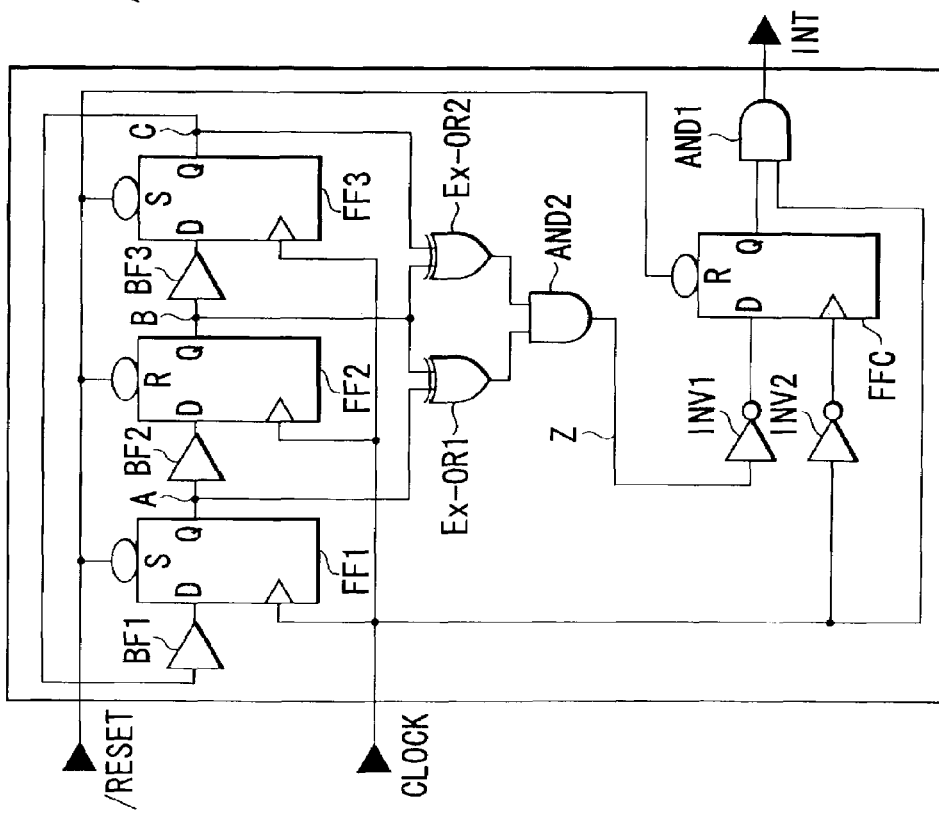
FIG. 7 is a block diagram showing an embodiment 2 of the instantaneous blackout detecting circuit.
Figure 9:
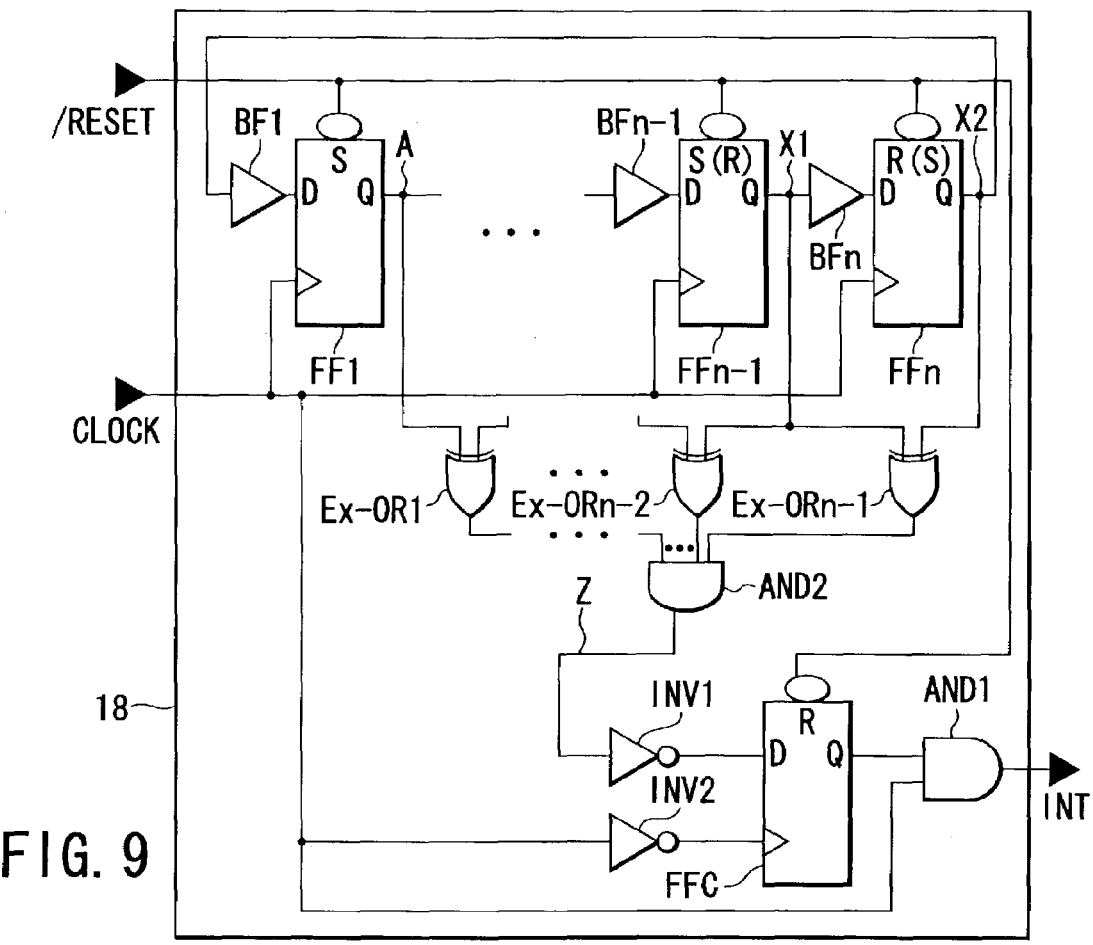
FIG. 9 is a block diagram showing a general example of the instantaneous blackout detecting circuit.

FIG. 7 shows the embodiment 2 of the instantaneous blackout detecting circuit.

The embodiment 2 differs from the above embodiment 1 in that three flip-flop circuits constituting the instantaneous blackout detecting section are provided.

According to the embodiment 2, the instantaneous blackout detecting circuit has three flip-flop circuits, FF1 to FF3 constituting the instantaneous blackout detecting section, and a flip-flop circuit FFC.

An output terminal Q of the flip flop circuit FF1 is connected to one of two input terminals of an exclusive-OR gate circuit Ex-OR1 while being connected to an input terminal D of the flip-flop circuit FF2 via a buffer BF2.

An output terminal Q of the flip-flop circuit FF2 is connected to the other of two input terminals of the exclusive-OR gate circuit Ex-OR1 and to one of two input terminals of an exclusive-OR gate circuit Ex-OR2 while being connected to an input terminal D of the flip-flop circuit FF3 via a buffer BF3.

An output terminal Q of the flip flop circuit FF3 is connected to the other of two input terminals of an exclusive-OR gate circuit Ex-OR2 while being connected to an input terminal D of the flip-flop circuit FF1 via a buffer BF1.

An output terminal of the exclusive-OR gate circuit Ex-OR1 is connected to one of two input terminals of an AND gate circuit AND2. An output terminal of the exclusive-OR gate circuit Ex-OR2 is connected to the other of two input terminals of an AND gate circuit AND2.

The output terminal of the AND gate circuit AND2 is connected to an input terminal D of the flip-flop circuit FFC via an inverter INV1. An output terminal Q of the flip-flop circuit FFC is connected to one of two input terminals of the AND gate circuit AND1.

The AND gate circuit AND1 outputs the instantaneous blackout detection signal INT.

The flip-flop circuits FF1 to FF3 individually have a function of transferring the data of the input terminal D to the output terminal Q in synchronous with a rise edge of the clock signal CLOCK when the reset signal /RESET is "H".

The clock signal CLOCK is inputted to the above flip-flop circuits FF1 to FF3. On the other hand, a signal inverting a level of the clock signal CLOCK by an inverter INV2 is inputted to the flip-flop circuit FFC.

Therefore, the flip-flop circuit FFC has a function of transferring the data of the input terminal D to the output terminal Q in synchronous with a fall edge of the clock signal CLOCK, that is, a rise edge of the output signal of the inverter INV2 when the reset signal /RESET is "H".

Namely, shift occurs by a half period of the clock signal CLOCK between timing when the flip-flop circuits FF1 to FF3 transfer data and timing when the flip-flop circuit FFC transfers data.

The reset signal /RESET is a signal for initializing the above flip-flop circuits FF1 to FF3 and FFC.

In the embodiment, when the reset signal /RESET becomes "L", the flip-flop circuits FF1 and FF3 are initialized to a set state (i.e., output is "H" state)(initial state). On the other hand, the flip-flop circuits FF2 and FFC are initialized to a reset state (i.e., output is "L" state)(initial state).

While the reset signal /RESET is "L", the above flip-flop circuits FF1 to FF3 and FFC maintains the initial state.

[Operation]

The operation of the embodiment 2 is the same as that of the above embodiment 1; therefore, the details are omitted. In brief, when the instantaneous blackout occurs, if the output signals of the flip-flop circuits FF1 to FF3 included in the instantaneous blackout detecting circuit become all "L", the operation waveform diagram shown in FIG. 4 is intactly applicable. On the other hand, when the instantaneous blackout occurs, if the output signals of the flip-flop circuits FF1 to FF3 included in the same as above become all "H", the operation waveform diagram shown in FIG. 5 is intactly applicable.

[Instantaneous Blackout Detecting Probability]

In the embodiment 2, when the instantaneous blackout occurs, the flip-flop circuits FF1 to FF3 malfunction. Further, when the internal power-supply voltage returns to the initial value after the instantaneous blackout ends, the data value held in these circuits become an arbitrary value. Theoretically, the data held in the flip-flop circuits FF1 to FF3 is any one of eight combinations (FF1, FF2, FF3)=(0, 0, 0), (0, 0, 1), (0, 1, 0), (0, 1, 1), (1, 0, 0), (1, 0, 1), (1, 1, 0), and (1, 1, 1).

Experimentally, when the instantaneous blackout occurs, the data of the flip-flop circuits FF1 to FF3 has a tendency to both change to the same value (FF1, FF2, FF3)=(0, 0, 0) or (1, 1, 1).

In the normal operation, the data held by the flip-flop circuits FF1 to FF3 has two ways, that is, (FF1, FF2, FF3)=(0, 1, 0) or (1, 0, 1). Only when the above case is formed, the output signal (node Z) of the AND gate circuit AND2 becomes "H".

In other words, if the data held by the flip-flop circuits FF1 to FF3 is the remaining six ways other than two ways in the normal operation, the output signal (node Z) of the AND gate circuit AND2 becomes "L"; therefore, the instantaneous blackout is detected.

In conclusion, when the instantaneous blackout occurs, the output signal (node Z) of the AND gate circuit AND2 becomes "L" at least ⅝ (=¾) or more probability. Namely, according to the embodiment, the number of the flip-flop circuits constituting the instantaneous blackout detecting circuit 18 is set to three, and thereby, it is possible to detect the instantaneous blackout at least ¾ or more probability.

⑦ Embodiment 3 of Instantaneous Blackout Detecting Circuit

[Circuit Configuration]

Figure 8:
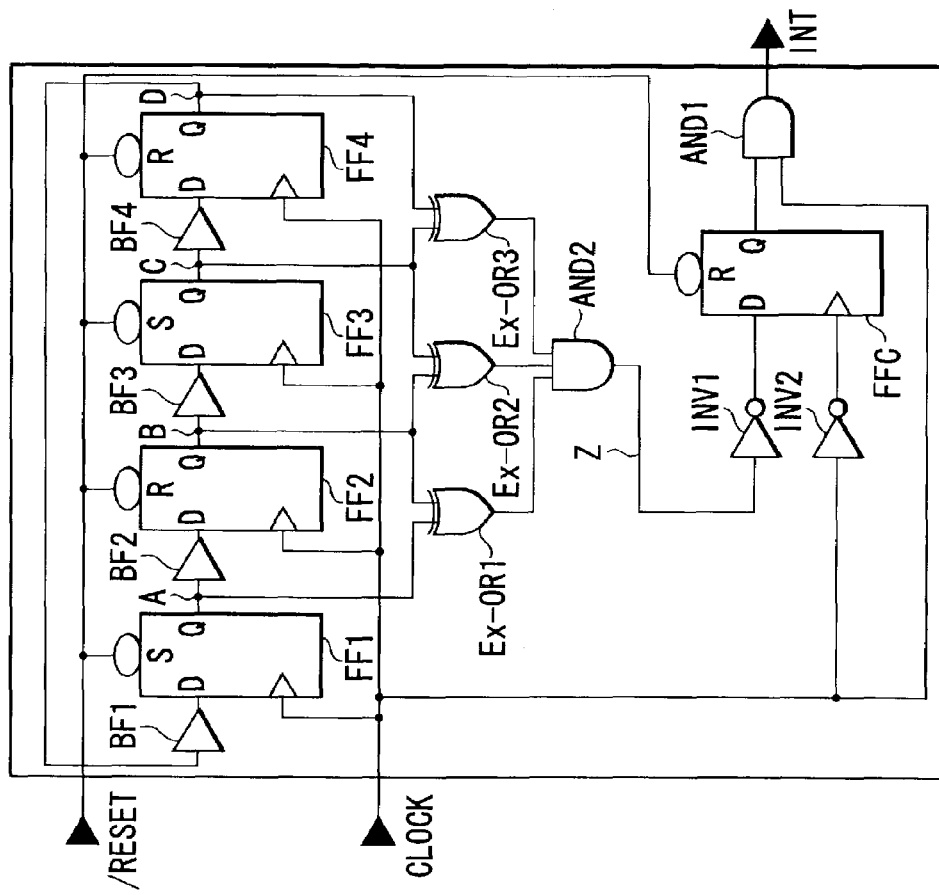
FIG. 8 is a block diagram showing an embodiment 3 of the instantaneous blackout detecting circuit.

FIG. 8 shows the embodiment 3 of the instantaneous blackout detecting circuit.

The embodiment 3 differs from the above embodiment 1 in that four flip-flop circuits constituting the instantaneous blackout detecting section are provided.

According to the embodiment 3, the instantaneous blackout detecting circuit has four flip-flop circuits FF1 to FF4 constituting the instantaneous blackout detecting section, and a flip-flop circuit FFC.

An output terminal Q of the flip flop circuit FF1 is connected to one of two input terminals of an exclusive-OR gate circuit Ex-OR1 while being connected to an input terminal D of the flip-flop circuit FF2 via a buffer BF2.

An output terminal Q of the flip-flop circuit FF2 is connected to the other of two input terminals of the exclusive-OR gate circuit Ex-OR1 and to one of two input terminals of an exclusive-OR gate circuit Ex-OR2 while being connected to an input terminal D of the flip-flop circuit FF3 via a buffer BF3.

An output terminal Q of the flip flop circuit FF3 is connected to the other of two input terminals of an exclusive-OR gate circuit Ex-OR2 and to one of two input terminals of an exclusive-OR gate circuit Ex-OR3 while being connected to an input terminal D of the flip-flop circuit FF4 via a buffer BF4.

An output terminal Q of the flip flop circuit FF4 is connected to the other of two input terminals of the exclusive-OR gate circuit Ex-OR3 while being connected to an input terminal D of the flip-flop circuit FF1 via a buffer BF1.

An output terminal of the exclusive-OR gate circuit Ex-OR1 is connected to one of two input terminals of an AND gate circuit AND2. An output terminal of the exclusive-OR gate circuit Ex-OR2 is connected to one of three input terminals of an AND gate circuit AND2. An output terminal of the exclusive-OR gate circuit Ex-OR3 is connected to one of three input terminals of an AND gate circuit AND2.

The output terminal of the AND gate circuit AND2 is connected to an input terminal D of the flip-flop circuit FFC via an inverter INV1. An output terminal Q of the flip-flop circuit FFC is connected to one of two input terminals of the AND gate circuit AND1.

The AND gate circuit AND1 outputs the instantaneous blackout detection signal INT.

The flip-flop circuits FF1 to FF4 individually have a function of transferring the data of the input terminal D to the output terminal Q in synchronous with rise edge of the clock signal CLOCK when the reset signal /RESET is "H".

The clock signal CLOCK is inputted to the above flip-flop circuits FF1 to FF4. On the other hand, a signal inverting a level of the clock signal CLOCK by an inverter INV2 is inputted to the flip-flop circuit FFC.

Therefore, the flip-flop circuit FFC has a function of transferring the data of the input terminal D to the output terminal Q in synchronous with a fall edge of the clock signal CLOCK, that is, a rise edge of the output signal of the inverter INV2 when the reset signal /RESET is "H".

Namely, shift occurs by a half period of the clock signal CLOCK between timing when the flip-flop circuits FF1 to FF4 transfer data and timing when the flip-flop circuit FFC transfers data.

The reset signal /RESET is a signal for initializing the above flip-flop circuits FF1 to FF4 and FFC.

In the embodiment, when the reset signal /RESET becomes "L", the flip-flop circuits FF1 and FF3 are initialized to a set state (i.e., output is "H" state)(initial state). On the other hand, the flip-flop circuits FF2, FF4 and FFC are initialized to a reset state (i.e., output is "L" state)(initial state).

While the reset signal /RESET is "L", the above flip-flop circuits FF1 to FF4 and FFC maintains the initial state.

[Operation]

The operation of the embodiment 3 is the same as that of the above embodiment 1; therefore, the details are omitted. In brief, when the instantaneous blackout occurs, if the output signals of the flip-flop circuits FF1 to FF4 included in the instantaneous blackout detecting circuit become all "L", the operation waveform diagram shown in FIG. 4 is intactly applicable. On the other hand, when the instantaneous blackout occurs, if the output signals of the flip-flop circuits FF1 to FF4 included in the same as above become all "H", the operation waveform diagram shown in FIG. 5 is intactly applicable.

[Instantaneous Blackout Detecting Probability]

In the embodiment 3, when the instantaneous blackout occurs, the flip-flop circuits FF1 to FF4 malfunction. Further, when the internal power-supply voltage returns to the initial value after the instantaneous blackout ends, the data value held in these circuits become an arbitrary value. Theoretically, the data held in the flip-flop circuits FF1 to FF4 is any one of 16 combinations (FF1, FF2, FF3, FF4)=(0, 0, 0, 0), (0, 0, 0, 1), (0, 0, 1, 0), (0, 0, 1, 1), (0, 1, 0, 0), (0, 1, 0, 1), (0, 1, 1, 0), (0, 1, 1, 1), (1, 0, 0, 0), (1, 0, 0, 1), (1, 0, 1, 0), (1, 0, 1, 1), (1, 1, 0, 0), (1, 1, 0, 1), (1, 1, 1, 0) and (1, 1, 1, 1).

Experimentally, when the instantaneous blackout occurs, the data of the flip-flop circuits FF1 to FF4 has a tendency to both change to the same value (FF1, FF2, FF3, FF4)=(0, 0, 0, 0) or (1, 1, 1, 1).

In the normal operation, the data held by the flip-flop circuits FF1 to FF4 has two ways, that is, (FF1, FF2, FF3, FF4)=(0, 1, 0, 1) or (1, 0, 1, 0). Only when the above case is formed, the output signal (node Z) of the AND gate circuit AND2 becomes "H".

In other words, if the data held by the flip-flop circuits FF1 to FF4 is the remaining 14 ways other than two ways in the normal operation, the output signal (node Z) of the AND gate circuit AND2 becomes "L"; therefore, the instantaneous blackout is detected.

In conclusion, when the instantaneous blackout occurs, the output signal (node Z) of the AND gate circuit AND2 becomes "L" at least ¹⁴⁄₁₆ (=⅞) or more probability. Namely, according to the embodiment, the number of the flip-flop circuits constituting the instantaneous blackout detecting circuit 18 is set to three, and thereby, it is possible to detect the instantaneous blackout at least ⅞ or more probability.

⑧ General Example of Instantaneous Blackout Detecting Circuit

[Circuit Configuration]

FIG. 8 shows a general example of the instantaneous blackout detecting circuit.

The general example has features that the above embodiments 1 to 3 are generalized, that is, the number of the flip-flop circuits constituting the instantaneous blackout detecting section is set to n (n is plural).

In the general example, the instantaneous blackout detecting circuit has n flip-flop circuits FF1, ... FFn−1, FFn constituting the instantaneous blackout detecting section, and a flip-flop circuit FFC.

An output terminal Q of the flip-flop circuit FF1 is connected to one of two input terminals of an exclusive-OR gate circuit Ex-OR1.

An output terminal Q of the flip-flop circuit FFn−1 is connected to one of two input terminals of an exclusive-OR gate circuit Ex-ORn−2 and to one of two input terminals of an exclusive-OR gate circuit Ex-ORn−1 while being connected to an input terminal D of the flip-flop circuit FFn via a buffer BFn.

An output terminal Q of the flip flop circuit FFn is connected to the other of two input terminals of an exclusive-OR gate circuit Ex-ORn−1 while being connected to an input terminal D of the flip-flop circuit FF1 via a buffer BF1.

An output terminal of the exclusive-OR gate circuit Ex-OR1 is connected to one of n−1 input terminals of an AND gate circuit AND2. An output terminal of the exclusive-OR gate circuit Ex-ORn−2 is connected to the other of n−1 input terminals of the AND gate circuit AND2. An output terminal of the exclusive-OR gate circuit Ex-ORn−1 is connected to one of n−1 input terminals of the AND gate circuit AND2.

The output terminal of the AND gate circuit AND2 is connected to an input terminal D of the flip-flop circuit FFC via an inverter INV1. An output terminal Q of the flip-flop circuit FFC is connected to one of two input terminals of the AND gate circuit AND1.

The AND gate circuit AND1 outputs the instantaneous blackout detection signal INT.

The flip-flop circuits FF1, ... FFn−1 and FFn individually have a function of transferring the data of the input terminal D to the output terminal Q in synchronous with a rise edge of the clock signal CLOCK when the reset signal /RESET is "H".

The clock signal CLOCK is inputted to the above flip-flop circuits FF, ... FFn−1 and FFn. On the other hand, a signal inverting a level of the clock signal CLOCK by an inverter INV2 is inputted to the flip-flop circuit FFC.

Therefore, the flip-flop circuit FFC has a function of transferring the data of the input terminal D to the output terminal Q in synchronous with a fall edge of the clock signal CLOCK, that is, a rise edge of the output signal of the inverter INV2 when the reset signal /RESET is "H".

Namely, shift occurs by a half period of the clock signal CLOCK between timing when the flip-flop circuits FF1, ... FFn−1 and FFn transfer data and timing when the flip-flop circuit FFC transfers data.

The reset signal /RESET is a signal for initializing the above flip-flop circuits FF1, ... FFn−1, FFn and FFC.

In the example, if n is an even number, when the reset signal /RESET becomes "L", the flip-flop circuits FF1, ... FFn−1 are initialized to a set state (i.e., output is "H" state)(initial state). On the other hand, the flip-flop circuits FF2, ... FFn are initialized to a reset state (i.e., output is "L" state)(initial state).

Further, if n is an odd number, when the reset signal /RESET becomes "L", the flip-flop circuits FF1, ... FFn are initialized to a set state (i.e., output is "H" state)(initial state). On the other hand, the flip-flop circuits FF2, ... FFn−1 are initialized to a reset state (i.e., output is "L" state)(initial state).

While the reset signal /RESET is "L", the above flip-flop circuits FF1, ... FFn−1, FFn and FFC maintains the initial state.

[Operation]

The operation of the above example is the same as that of the above embodiment 1; therefore, the details are omitted. In brief, when the instantaneous blackout occurs, if the output signals of the flip-flop circuits FF1, ... FFn−1, FFn included in the instantaneous blackout detecting circuit become all "L", the operation waveform diagram shown in FIG. 4 is intactly applicable. On the other hand, when the instantaneous blackout occurs, if the output signals of the flip-flop circuits FF1, ... FFn−1, FFn included in the same as above become all "H", the operation waveform diagram shown in FIG. 5 is intactly applicable.

[Instantaneous Blackout Detecting Probability]

The instantaneous blackout detecting probability in the general example is determined referring to the Instantaneous blackout detecting probability of the above embodiments 1 to 3.

The flip-flop circuits FF1, ... FFn−1 and FFn constituting the instantaneous blackout detecting section of the instantaneous blackout detecting circuit 18 are connected like ring. In this case, regardless of the number of the flip-flop circuits, the combination of the data held by n flip-flop circuits FF1, ... FFn−1 and FFn is always two ways, that is, (FF1, ... FFn−1, FFn)=(0, ... 1, 0), (1, ... 0, 1) in the normal operation.

On the other hand, the combination of the data held by n flip-flop circuits FF1, ... FFn−1 and FFn exists by $2^n$ ways.

Therefore, when the instantaneous blackout occurs, a probability (instantaneous blackout detecting probability) that the combination of the data held by n flip-flop circuits FF1, ... FFn−1 and FFn is other than two ways in the normal operation is obtained from the following equation.

$$(2^n-2)/2^n=(2^{n-1}-1)/2^{n-1}=1-(1/2^{n-1})$$

When proving each probability of the embodiments 1 to 3 using the above equation, the following results are as follows.

Case of n=2: $1-(1/2)=1/2$
Case of n=3: $1-(1/4)=3/4$
Case of n=4: $1-(1/8)=7/8$ Therefore, the above results coincide with the results (probability) of the above embodiments 1 to 3.

⑨ Others

According to an aspect of the present invention, if the instantaneous blackout occurs, the IC card with the instantaneous blackout detecting function can detect it at high probability, and can perform suitable processings so as to prevent the crash or malfunction of the IC.

In the above embodiments 1 to 3 and general example of the instantaneous blackout detecting circuit, at least one of the flip-flop circuit FFC and the AND gate circuit AND1 may be omitted.

According to an aspect of the present invention, the instantaneous blackout detecting circuit is sufficiently configured so long as the following circuits exist at least. The circuits include several flip-flop circuits connected like ring and a logic circuit for logically processing the output signal of the several flip-flop circuits.

In the LSI operation when the instantaneous blackout occurs, if the reset signal /RESET changes to "L" by the occurrence of instantaneous blackout, LSI system reset is carried out. Therefore, it seems that the crash or malfunction of IC dose not occur at least.

(2) IC Card with Display Function

① The IC card according to an aspect of the present invention has the following features. The IC card is additionally provided with a display function so that the user can confirm the results below with the use of the display function. One is the result whether or not data transmission/reception is accurately carried out with respect to a wireless communication reader/writer. Another is the result whether or not proper processing is performed by the data transmission/reception.

② Outline of IC Card

Figure 10:
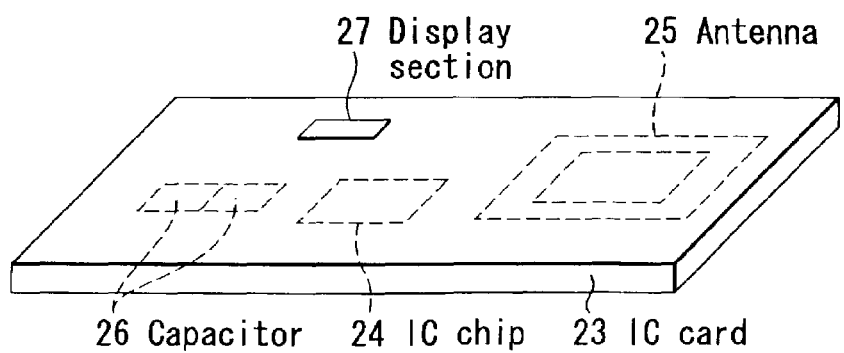
FIG. 10 is a view showing the configuration of an IC card with a display function according to the present invention.

FIG. 10 schematically shows an IC card according to an aspect of the present invention.

An IC card 23 is, for example, one of IC cards such as wireless card and combination card, which perform data transmission/reception with respect to the wireless communication reader/writer by wireless.

There has been proposed the following structures of the IC card 23. For example, one is a laminate structure of laminating a plurality of plastic layers, and another is a box-type structure of covering a concave portion of a plastic substrate having the concave portion with a plastic layer. However, the IC card 23 is not limited to the above structures, in particular.

In the IC card 23, an IC chip (wireless card LSI) 24, an antenna 25 and a capacitor 26 are built in, and further, the IC card 23 is provided with a display section 27.

The position of the above IC chip 24, antenna 25 and capacitor 26 in the IC card 23 is specially limited. In the present invention, the antenna 25 is arranged at part of the IC card 23; for example, it may be arranged along the edge portion of the IC card.

The display section 27 is a novel function of the IC card 23 provided according to the present invention. The display section 27 displays various results relevant to data transmission/reception to the owner of the IC card. Therefore, the display section 27 has elements appealing to the owner's five senses such as eyes and ears.

For instance, the display section 27 includes a luminous display section, a speech (voice) display section and a vibration display section. The luminous display section emits light (including brightness/dark, color, light emitting pattern (time, shape), etc.) so as to appeal to the owner's sense of seeing. The voice display section gives speech so as to appeal the owner's sense of hearing. The vibration display section appeals to the owner's sense of touch by vibration.

If the display section 27 is the luminous display section, the display section 27 comprises one or several LED (Light Emitting Device). For convenience of building the LED in the IC card 23, it is desirable to use a thin-type LED.

For example, if data transmission/reception is accurately carried out with respect to the wireless communication reader/writer or proper processing is performed by the data transmission/reception, the LED emits light. By doing so, the owner of the IC card 23 confirms the presence of light emitting by the display section of the IC card 23. In this manner, the owner of the IC card 23 can confirm whether or not data transmission/reception is accurately carried out with respect to the wireless communication reader/writer or proper processing is performed by the data transmission/reception.

If the display section 27 comprises a plurality of LEDs, the owner of the IC card 23 can confirm the result relevant to data transmission/reception based on the presence of light emitting by the LEDs and the light-emitting pattern (shape such as characters). In particular, if a plurality of LEDs is arranged like array, the result relevant to data transmission/reception can be displayed on the display section by display means such as characters and graphics.

Further, if the display section 27 comprises a plurality of LEDs, each LED include a function of emitting light having several kinds of colors, and the display section 27 comprises several kinds of LED emitting light having different color. By doing so, the owner of the IC card 23 can confirm the result relevant to data transmission/reception by the light color in addition to the presence of light emitting of the several LEDs and the light emitting pattern.

As described above, the display section 27 comprises a plurality of LEDs emitting light having several kinds of colors or several kinds of LED emitting light having different color. In this case, for example, the light-emitting pattern and the light color can be changed based on data registered in the non-volatile memory built in the IC card 23.

For instance, if grade such as silver card and gold card is given to the IC card, grade information of the IC card 23 is previously registered in the non-volatile memory. Based on the grade information, the light-emitting pattern and the light color can be changed.

In addition, pattern information (character and graphic information) and color information displayed on the display section may be determined based on information registered in the non-volatile memory.

③ Embodiment of Display System

Figure 11:
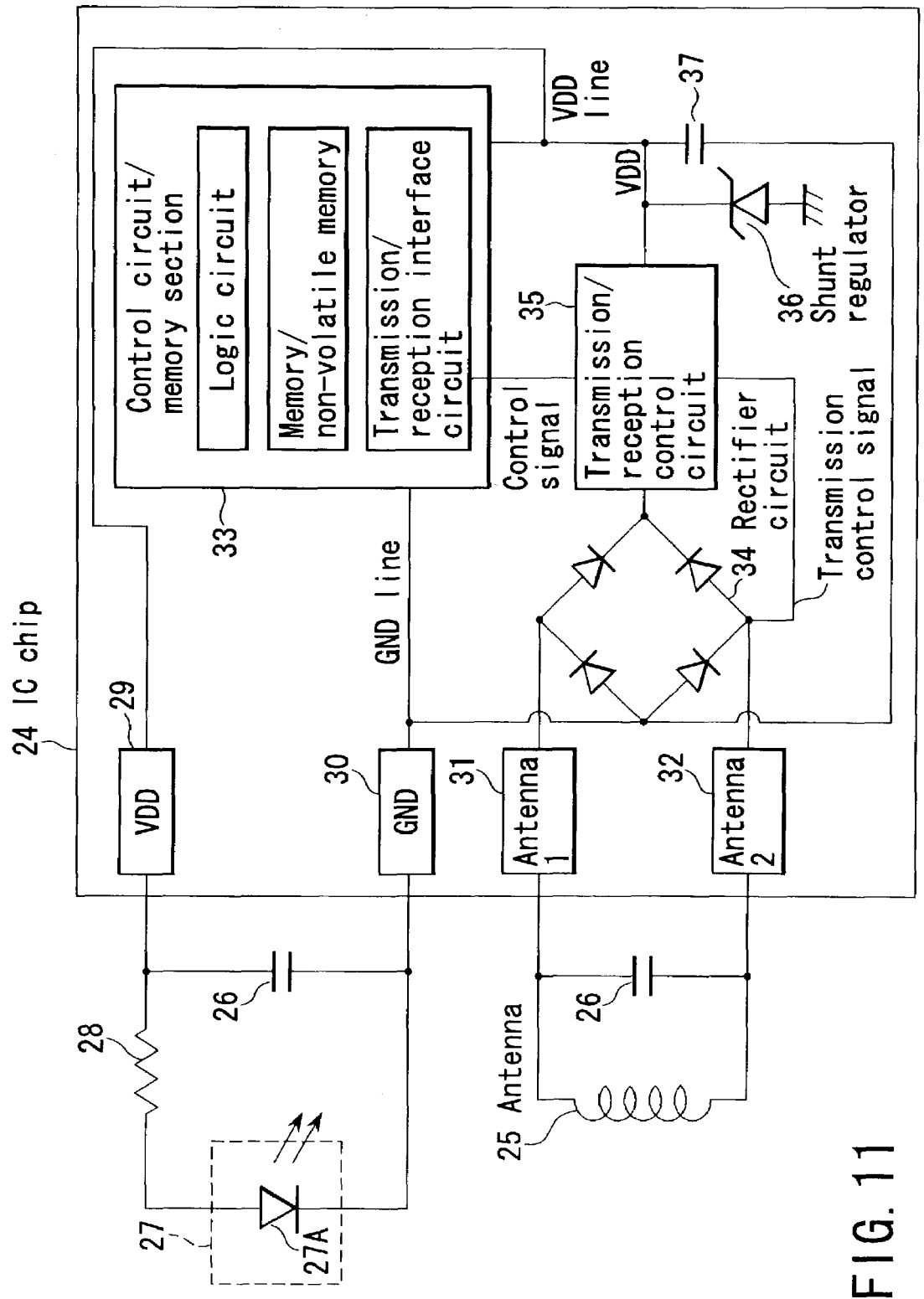
FIG. 11 is a block diagram showing the configuration of a display system.

FIG. 11 shows a display system built in the IC card of the present invention.

In the display system of the embodiment, identical reference numerals are used to designate the same elements as the IC card shown in FIG. 10.

The display system is configured in a manner that LED emits light when power is supplied to the IC chip from the wireless communication reader/writer via the antenna.

The IC chip (wireless card LSI) 24 has a power supply terminal 29, a ground terminal 30 and antenna terminals 31 and 32. An LED 27A is connected as the display section 27 between the power-supply terminal 29 and the ground terminal 30. A smoothing capacitor 26 and a resistor 28 are provided for stabilizing the power.

An antenna coil 25 and a capacitor 26 are connected in parallel between the antenna terminals 31 and 32. The tuning capacitor 26 is provided for tuning to a wireless communication frequency.

The IC chip 24 is formed with a control circuit/memory section 33, rectifier circuit 34, a transmission/reception control circuit 35, a shunt regulator 36 and power stabilizing capacitor 37.

The control circuit/memory section 33 includes memory (i.e., ROM, RAM, etc.), a non-volatile memory, a logic circuit and a transmission/reception interface circuit. The rectifier circuit 34 is connected between the antenna terminals 31 and 32, and rectifies an electromotive force generated in the antenna 25 so that a current can be give to transmission/reception control circuit 35.

The transmission/reception control circuit 35 supplies a control signal to the control circuit/memory section 33 while outputting a power supply potential VDD. The shunt regulator 36 is provided in order to discharge electrical charges when power is too supplied from the antenna 25, to stabilize the power supply potential VDD, and to prevent heating. The capacitor 37 has a function of stabilizing the power-supply potential VDD.

An output signal (power supply potential VDD) of the transmission/reception control circuit 35 is supplied to the control circuit/memory section 33 while being given to the power supply terminal 29.

In the above display system, when power is supplied to the IC chip 24 from the wireless communication reader/ writer via the antenna 25, the power supply potential VDD is generated so that the LED 27a of the display section 27 can emit light.

④ Summary

As described above, according to an aspect of the present invention, the IC card is additionally provided with the display function. Therefore, the owner can confirm the results below with the use of the IC card 23 when carrying out data transmission/reception with respect to the wireless communication reader/writer. One of the above results is determination whether or not data transmission/reception is accurately carried out with respect to the wireless communication reader/writer. Another is determination whether or not proper processing is performed by the data transmission/reception.

Incidentally, if the display section 27 is the luminous display section, the display section 27 may comprise liquid crystal and organic EL display devices in addition to LED.

(3) IC Card With Security Information Registering Function

① The IC card according to an aspect of the present invention is built in personal mobile information devices (PDA: Personal Digital Assistants). The feature is that the above has a recording area for recording security information of the personal mobile information device.

② Mobile Information Device (PDA)

Figure 12:
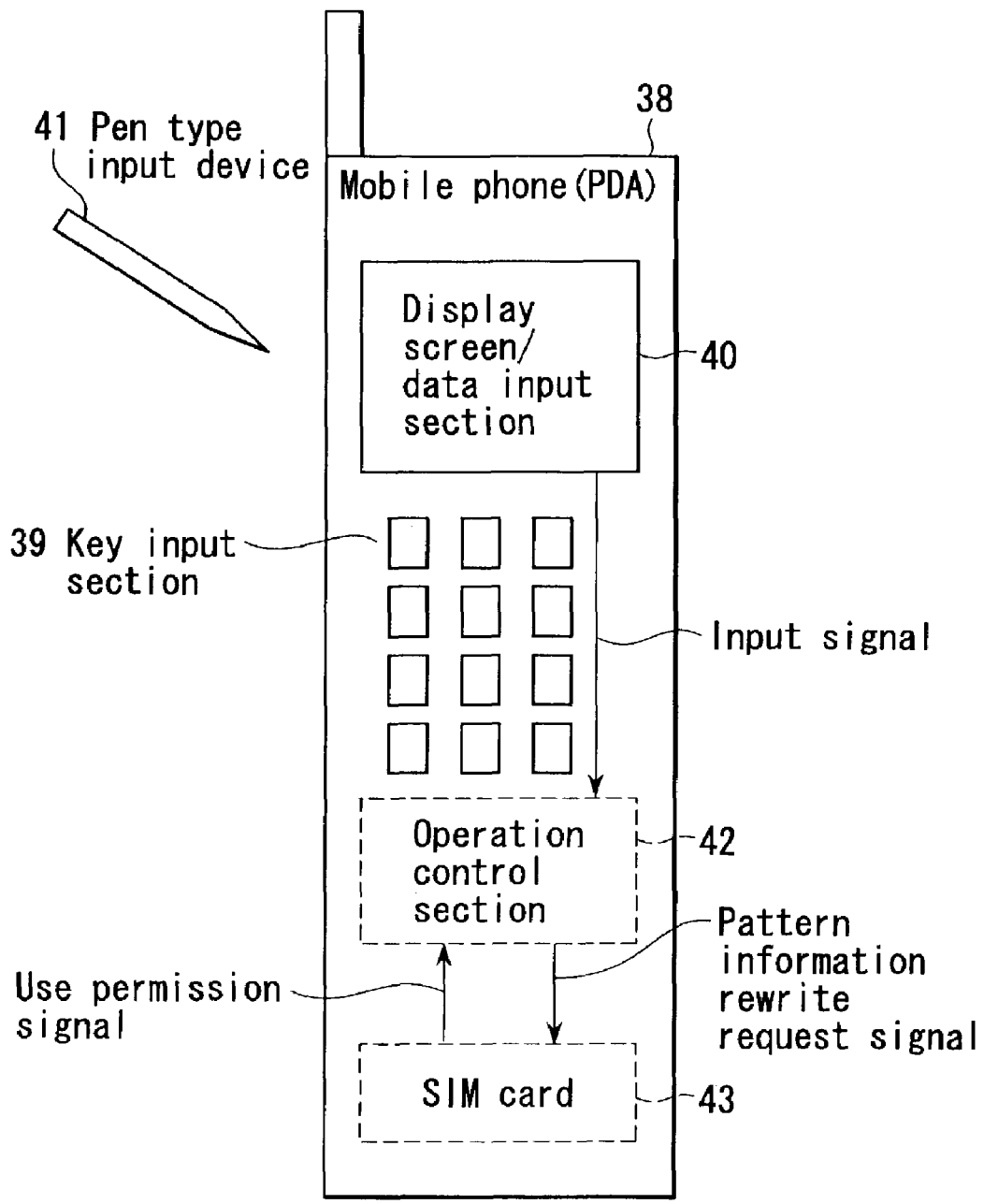
FIG. 12 is a view showing a mobile information device having a security function according to the present invention.

FIG. 12 schematically shows a personal mobile information device.

A mobile information device (e.g., mobile phone) 38 has a key input section 39, a display screen/data input section 40, a pen type input device 41, and an operation control section 42.

The key input section 39 can input numerical information, and inputs telephone numbers if the mobile information device has a personal identification number and a mobile phone function. The display screen/data input section 40 has a function of displaying character and graphic information, and a function of inputting the character and graphic information into the mobile information device 38 by using the pen type input device 41.

The above mobile information device 38 has a function of building (loading) an IC card (e.g., SIM card) 43 therein.

③ IC Card (SIM card)

Figure 13:
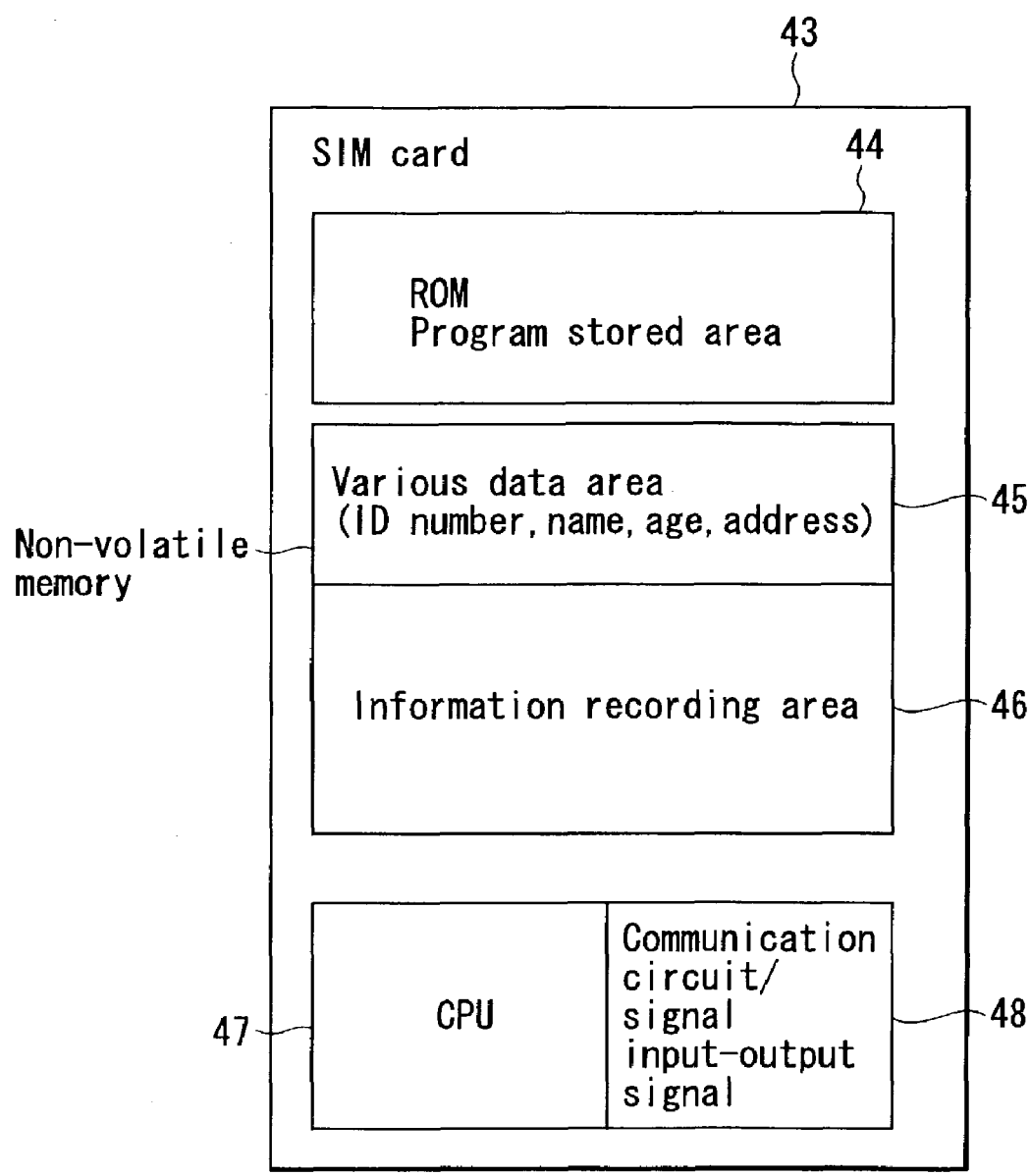
FIG. 13 is a view showing an IC card loaded into the mobile information device.

FIG. 13 schematically shows an IC card.

The IC card 43 has a ROM (program stored area) 44, a non-volatile memory, a CPU 47 and a communication circuit/signal input-output section 48. The above non-volatile memory includes a various data area 45 and an information recording area 46 for recording character and graphic information.

The ROM 44 stores programs for making data exchange between mobile informations devices and the IC card. Personal data such as User's ID number, name, age and address are registered in the various data area 45 of the non-volatile memory. The information recording area 46 of the non-volatile memory is an area for registering security information relevant to the present invention, and is newly provided element.

④ IC Card System

In the mobile information device having the function of loading the IC card shown in FIG. 12 and FIG. 13, personal data such as user's ID number, name, age and address are registered in the various data area 45 of the non-volatile memory.

Therefore, in disusing the mobile information device 38, the user previously takes the IC card 43 out of the mobile information device 38. By doing so, even if the user loses the mobile information device 38 only, illegal use by another person is prevented; as a result, the user does not receive great damage.

More specifically, unless the user inserts the IC card 43 into the mobile information device 38, it is impossible to use the mobile information device 38. Further, necessary information is all registered in the IC card 43; therefore, even if another person uses the mobile information device 38 using other IC card, the user has no charge of the use.

However, if the user loses the mobile information device 38 in a state that the IC card 43 is inserted into there, a person, who picks up it, can freely use the mobile information device 38. As a result, the user receives great damage by illegal use.

⑤ Security System of the Present Invention

According to an aspect of the present invention, security effect is further improved in the IC card system shown in FIG. 12 and FIG. 13 in the following manner. That is, even in a state that the IC card 43 is inserted into the mobile information device 38, it is impossible to use the mobile information device 38 so long as predetermined conditions are not satisfied.

Registration of Security Information

First, the user inputs security information from the display screen/data input section 40 using the pen type input device 41. The security information may be any other pattern information such as character and graphic information so long as the user can input it by the pen type input device.

An input signal (pattern information) used as security information is registered in the information recording area 46 of the non-volatile memory via the operation control section 42.

Use of Mobile Information Device

When using the mobile information device 38, the user inserts the IC card 43 into the mobile information device 38. When sensing the insertion (loading) of the IC card 43, the mobile information device 38 requires pattern information input to the user.

The user inputs the pattern information from the display screen/data input section 40 using the pen type input device 41.

The use of the mobile information device 38 is permitted when the following condition is satisfied. That is, the inputted pattern information coincides with the above pattern information (security information) registered in the information recording area 46 of the non-volatile memory of the IC card 43 with predetermined precision or more. On the contrary, the use of the mobile information device 38 is not permitted under the condition below. That is, the inputted pattern information does not coincide with the pattern information registered in the information recording area 46 with predetermined precision or more.

Others

Unless the security information (pattern information) is registered in the information recording area 46 of the non-volatile memory of the IC card 43, the user can intactly use the mobile information device 38. In this case, the input of security information is not required from the mobile information device 38.

In addition, the user can change the security information (pattern information) registered in the information recording area 46 of the non-volatile memory of the IC card 43.

⑥ Operation

The operation relevant to the security of the mobile information device shown in FIG. 12 and FIG. 13 will be described below.

The registration area of the pattern information (security information is set to the whole or part of the display screen/data input section 40. The registration area comprises n×m (n and m are plural, e.g., n=100, m=100) pixels (or dots). Each pixel is presented by one-bit information such as brightness (="1") and darkness (="0").

For example, in the initial state, n×m pixels of the registration area become all logic "1" state, and part touched by the pen type input device 41, the pixel changes from the logic "1" state to logic "0" state.

When registering the security information, "1"/"0" information (matrix data) of each pixel of the registration area, that is, pattern information is registered in the information recording area 46 of the non-volatile memory of the IC card 43 (e.g., SIM card). In this case, the pattern information may include other patterns such as characters and graphics.

In the use of the mobile information device, for example, when the user inserts the IC card 43 into there or pushes a predetermined key in a state that the IC card 43 is inserted; the CPU 47 detects the above operation. Thereafter, the CPU 47 requires the pattern information (matrix data) input to the user (input information waiting state).

The request of pattern information input is made if all data of the information recording area 46 of the non-volatile memory of the IC card 43 are not "1" (at least one pixel is "0", that is, if security information is registered.

If the data of the information recording area 46 of the non-volatile memory of the IC card 43 are all "1", that is, if security information is not registered, the IC card immediately outputs a use permission signal to the operation control section 42.

Based on the above request of pattern information input, the user inputs the pattern information from the display screen/data input section 40 using the pen type input device 41.

The pattern information is transferred to the IC card 43 via the operation control section 42. Unless a rewrite request is made (if a rewrite request signal is not activated), the IC card 43 compares the inputted pattern information with the pattern information (security information) already registered in the information recording area 46.

Correspondence/non-correspondence of the inputted pattern information and the pattern information already registered in the information recording area 46 is confirmed for each pixel.

If a degree of correspondence of the inputted pattern information and the pattern information registered in the information recording area 46 is more than a predetermined value (e.g., 95%), the IC card 43 outputs a use permission signal to the operation control section 42. If the degree of correspondence of the same as above is less than the predetermined value, the IC card 43 does not output the use permission signal to the operation control section 42.

Also, the above inputted pattern information is given to the IC card 43 while an activated rewrite request signal being given thereto. In this case, the IC card 43 reregisters newly inputted pattern information in the information recording area 46 in place of the pattern information already registered.

Incidentally, unless the IC card 43 is inserted into the mobile information device 38, no use permission signal is given to the operation control section 42.

⑦ Summary

As is evident from the above description, according to an aspect of the present invention, even if the IC card 43 is inserted into the mobile information device 38, the use of the mobile information device 38 is not permitted so long as the following condition is not satisfied. The condition is the correspondence of pattern information comprising character and graphic information. By doing so, the security function of mobile information device 38 can be further improved.

In an aspect of the present invention, numerical information such as personal identification number may be registered in the information recording area 46 of the non-volatile memory in place of the above pattern information such as character and graphic information. The numerical information is inputted from the key input section 39. In this case, preferably, the personal identification number is set so that it has no change from default or is hard to be anticipated.

As described above, in the multi-function IC card according to an aspect of the present invention, the IC card is provided with the following various functions. The functions are instantaneous blackout detecting function, display function relevant to data transmission/reception, and further, high security function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An instantaneous blackout detecting circuit comprising:
   a plurality of flip-flop circuits connected like a ring; and
   logic circuits making an exclusive-OR operation of output signals of mutually adjacent two flip-flop circuits of said plurality of flip-flop circuits,
   wherein the initial condition is set so that data of mutually adjacent two flip-flop circuits of the several flip-flop circuits becomes mutually different value.

2. An instantaneous blackout detecting circuit according to claim 1, wherein if the number of the flip-flop circuits is three or more, the logic circuit includes a plurality of exclusive-OR gate circuits and an AND gate circuit making an AND operation of output signals of said plurality of exclusive-OR gate circuits.

3. An instantaneous blackout detecting circuit according to claim 2, further comprising:
   an output flip-flop circuit holding an output signal of the logic circuit.

4. An instantaneous blackout detecting circuit according to claim 3, wherein said plurality of flip-flop circuits and the output flip-flop circuit both operate in synchronous with a clock signal, and shift occurs by a half period of the clock signal CLOCK between timing when said plurality of flip-flop circuits operate and timing when the output flip-flop circuit operates.

5. An instantaneous blackout detecting circuit according to claim 4, further comprising:
   an AND gate circuit making an AND operation of the clock signal and the output signal of the output flip-flop circuit.

6. An IC chip comprising an instantaneous blackout detecting circuit according to claim 1, 2, 3, 4 or 5.

7. A multi-function IC card comprising an IC chip according to claim 6.

* * * * *